US010319373B2

(12) United States Patent
Nagao (10) Patent No.: US 10,319,373 B2
(45) Date of Patent: Jun. 11, 2019

(54) INFORMATION PROCESSING DEVICE, INFORMATION PROCESSING METHOD, COMPUTER PROGRAM PRODUCT, AND RECOGNITION SYSTEM

(71) Applicant: Kabushiki Kaisha Toshiba, Tokyo (JP)

(72) Inventor: Manabu Nagao, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 21 days.

(21) Appl. No.: 15/390,232

(22) Filed: Dec. 23, 2016

(65) Prior Publication Data
US 2017/0263242 A1 Sep. 14, 2017

(30) Foreign Application Priority Data
Mar. 14, 2016 (JP) ................................. 2016-049424

(51) Int. Cl.
*G10L 15/14* (2006.01)
*G10L 15/187* (2013.01)

(52) U.S. Cl.
CPC .......... *G10L 15/142* (2013.01); *G10L 15/144* (2013.01); *G10L 15/187* (2013.01)

(58) Field of Classification Search
None
See application file for complete search history.

(56) References Cited

U.S. PATENT DOCUMENTS 5,274,739 A * 12/1993 Woodard ................ G10L 15/10
  704/233
5,506,933 A * 4/1996 Nitta ..................... G10L 15/144
  704/204

(Continued)

FOREIGN PATENT DOCUMENTS

JP 2001-195087 7/2001
JP 2003-5787 1/2003
(Continued)

OTHER PUBLICATIONS

Petrik et al., "Reconstructing Medical Dictations from Automatically Recognized and Non-literal Transcripts with Phonetic Similarity Matching", Proc ICASSP, 2007, pp. IV-1125-IV-1128.

(Continued)

*Primary Examiner* — Thuykhanh Le
(74) *Attorney, Agent, or Firm* — Finnegan, Henderson, Farabow, Garrett & Dunner, L.L.P.

(57) ABSTRACT

An information processing device includes a phonetic converting unit, an HMM converting unit, and a searching unit. The phonetic converting unit converts a phonetic symbol sequence into a hidden Markov model (HMM) state sequence in which states of an HMM are aligned. The HMM converting unit converts the HMM state sequence into a score vector sequence indicating the degree of similarity to a specific pronunciation using a similarity matrix defining the similarity between the states of the HMM. The searching unit searches for a path having a better score for the score vector sequence than that of the other paths out of paths included in a search network and outputs a phonetic symbol sequence corresponding to the retrieved path.

5 Claims, 5 Drawing Sheets

(56) References Cited

U.S. PATENT DOCUMENTS

| | | | | |
|---|---|---|---|---|
| 5,632,002 A * | 5/1997 | Hashimoto | ............ | G06F 3/165 704/231 |
| 5,649,056 A * | 7/1997 | Nitta | ............ | G09B 19/04 704/256 |
| 8,112,277 B2 * | 2/2012 | Sakai | ............ | G10L 15/063 704/245 |
| 2003/0088409 A1 | 5/2003 | Harris | ............ | G10L 17/26 704/231 |
| 2008/0010065 A1 * | 1/2008 | Bratt | ............ | G06K 9/6222 704/246 |
| 2008/0114595 A1 * | 5/2008 | Vair | ............ | G10L 15/08 704/236 |
| 2008/0312926 A1 * | 12/2008 | Vair | ............ | G10L 17/14 704/249 |
| 2010/0070277 A1 * | 3/2010 | Arakawa | ............ | G10L 15/02 704/246 |
| 2011/0125701 A1 * | 5/2011 | Nair | ............ | G06K 9/6293 706/52 |
| 2011/0205331 A1 * | 8/2011 | Kato | ............ | H04N 7/147 348/14.08 |
| 2011/0208521 A1 * | 8/2011 | McClain | ............ | G10L 15/142 704/233 |
| 2013/0006623 A1 * | 1/2013 | Chelba | ............ | G10L 15/187 704/233 |
| 2013/0138441 A1 | 5/2013 | Kim et al. | | |
| 2014/0012586 A1 * | 1/2014 | Rubin | ............ | G10L 25/51 704/273 |
| 2014/0149119 A1 * | 5/2014 | Sak | ............ | G06F 17/2775 704/260 |
| 2014/0180694 A1 * | 6/2014 | Fastow | ............ | G10L 15/02 704/256.1 |
| 2014/0200894 A1 * | 7/2014 | Osowski | ............ | G10L 13/08 704/260 |
| 2014/0379345 A1 * | 12/2014 | Chung | ............ | G10L 15/05 704/248 |
| 2015/0039299 A1 * | 2/2015 | Weinstein | ............ | G10L 15/16 704/202 |
| 2015/0039301 A1 * | 2/2015 | Senior | ............ | G10L 15/16 704/232 |
| 2015/0066495 A1 * | 3/2015 | Zhang | ............ | G10L 15/02 704/231 |
| 2015/0112684 A1 * | 4/2015 | Scheffer | ............ | G10L 17/14 704/257 |
| 2015/0127327 A1 * | 5/2015 | Bacchiani | ............ | G10L 25/30 704/202 |
| 2015/0127337 A1 * | 5/2015 | Heigold | ............ | G10L 15/063 704/232 |
| 2015/0127349 A1 * | 5/2015 | Agiomyrgiannakis | ............ | G10L 15/142 704/266 |
| 2015/0127350 A1 * | 5/2015 | Agiomyrgiannakis | ............ | G10L 13/02 704/266 |
| 2015/0155440 A1 | 6/2015 | Fang et al. | | |
| 2015/0178285 A1 * | 6/2015 | Nagao | ............ | G06F 16/90344 707/748 |
| 2015/0179166 A1 | 6/2015 | Nagao | | |
| 2015/0179177 A1 | 6/2015 | Nagao | | |
| 2015/0220074 A1 * | 8/2015 | Nagao | ............ | G05B 19/045 700/87 |
| 2015/0269931 A1 * | 9/2015 | Senior | ............ | G10L 15/063 704/245 |
| 2015/0371631 A1 * | 12/2015 | Weinstein | ............ | G10L 15/08 704/256.4 |
| 2015/0371633 A1 * | 12/2015 | Chelba | ............ | G10L 15/063 704/240 |
| 2016/0093289 A1 * | 3/2016 | Pollet | ............ | G10L 13/047 704/260 |
| 2016/0093292 A1 * | 3/2016 | Hofer | ............ | G10L 15/02 704/240 |
| 2016/0189707 A1 * | 6/2016 | Donjon | ............ | H03G 7/002 704/205 |
| 2016/0350282 A1 * | 12/2016 | Zhang | ............ | G06F 17/2765 |
| 2016/0379624 A1 | 12/2016 | Fujimura | | |
| 2016/0379632 A1 * | 12/2016 | Hoffmeister | ............ | G10L 15/18 704/253 |
| 2016/0379638 A1 * | 12/2016 | Basye | ............ | G06F 17/30764 704/235 |
| 2017/0257212 A1 * | 9/2017 | Domosi | ............ | H04L 9/06 |

FOREIGN PATENT DOCUMENTS

| | | |
|---|---|---|
| JP | 2003-131693 | 5/2003 |
| JP | 2004-317845 | 11/2004 |
| JP | 2006-84942 | 3/2006 |
| JP | 2015-121707 | 7/2015 |
| JP | 2015-121708 | 7/2015 |
| JP | 2015-121709 | 7/2015 |
| JP | 2015-143800 | 8/2015 |
| JP | 2016-102947 | 6/2016 |
| JP | 2017-9842 | 1/2017 |

OTHER PUBLICATIONS

Povey et al., "Generating Exact Lattices in the WFST Framework," Proc. ICASSP, 2012, pp. 4213-4216.

Dixon et al., "A Specialized WFST Approach for Class Models and Dynamic Vocabulary", Proc. Interspeech, 2012.

Ristad et al.,, "Learning String-Edit Distance," IEEE Transactions on Pattern Analysis and Machine Intelligence, vol. 20, No. 5, May 1998, pp. 522-532.

Naushad R. et al., "T12: And advanced text input system with phonetic support for mobile devices," Proc. of the 2nd International Conference on Mobile Technology, Applications and Systems, 2005.

* cited by examiner

INFORMATION PROCESSING DEVICE, INFORMATION PROCESSING METHOD, COMPUTER PROGRAM PRODUCT, AND RECOGNITION SYSTEM

CROSS-REFERENCE TO RELATED APPLICATIONS

This application is based upon and claims the benefit of priority front Japanese Patent Application No. 2016-049424, filed on Mar. 14, 2016; the entire contents of which are incorporated herein by reference.

FIELD

Embodiments described herein relate generally to an information processing device, an information processing method, a computer program product, and a recognition system.

BACKGROUND

There have been developed techniques for deriving the similarity between two phonetic symbol sequences to predict an error in speech recognition and model phonetic variations, for example.

When two phonetic symbol sequences are supplied, for example, the conventional techniques can calculate the similarity therebetween. When a certain phonetic symbol sequence is supplied, however, the conventional techniques fail to derive a phonetic symbol sequence similar to the certain phonetic symbol sequence.

DETAILED DESCRIPTION

According to one embodiment, an information processing device includes a phonetic converting unit, an HMM converting unit, and a searching unit. The phonetic converting unit converts a phonetic symbol sequence into a hidden Markov model (HMM) state sequence in which states of an HMM are aligned. The HMM converting unit converts the HMM state sequence into a score vector sequence indicating the degree of similarity to a specific pronunciation using a similarity matrix defining the similarity between the states of the HMM. The searching unit searches for a path having a better score for the score vector sequence than that of the other paths out of paths included in a search network and outputs a phonetic symbol sequence corresponding to the retrieved path.

Exemplary embodiments of an information processing device according to the present invention are described below in greater detail with reference to the accompanying drawings.

To find a word likely to be erroneously recognized in speech recognition, for example, it may be effective to derive a phonetic symbol sequence similar to a supplied phonetic symbol sequence. In addition, techniques for deriving a phonetic symbol sequence similar to a certain phonetic symbol sequence may be applied to a function to search for a spelling of a word with a phoneme symbol sequence, a function to normalize loanwords in a document retrieval device, and other functions. As described above, however, the conventional techniques for calculating the similarity between two phonetic symbol sequences fail to derive a phonetic symbol sequence similar to another phonetic symbol sequence.

First Embodiment

A first embodiment can derive a phonetic symbol sequence (similar phonetic symbol sequence) similar to a supplied phonetic symbol sequence. An information processing device according to the first embodiment uses part of functions of a speech recognition device that outputs a phonetic symbol sequence corresponding to speech. The information processing device according to the first embodiment introduces a similarity matrix in processing for converting a phonetic symbol sequence into a score vector sequence to be input to the speech recognition device. With these functions, when receiving a phonetic symbol sequence, the information processing device can derive a similar phonetic symbol sequence.

Definition

Phonetic symbols are symbols indicating pronunciations. Examples of the phonetic symbols include speech symbols, phoneme symbols, syllabic symbols, etc. The phonetic symbols are not limited thereto and may be any symbol that can represent a pronunciation. The phonetic symbols may be the International Phonetic Alphabet, the Speech Assessment Methods Phonetic Alphabets (SAMPA), or the Extended SAM Phonetic Alphabet (X-SAMPA), for example. Numbers assigned to respective pronunciations to be used may be used as the phonetic symbols. In Japanese, hiragana or katakana may be used as the phonetic symbols.

A phonetic HMM is a hidden Markov model (HMM) associated with a pronunciation. In a case where the pronunciation is a phoneme, it may be called a phoneme HMM. The HMM used in the present embodiment is a left-to-right HMM in which state transition proceeds from left to right and does not include a bifurcated state. Transition, however, may be bifurcated.

A weighted finite state transducer (WFST) is a finite automaton in which an input symbol, an output symbol, and a weight are associated with a transition.

Device Configuration

Figure 1:
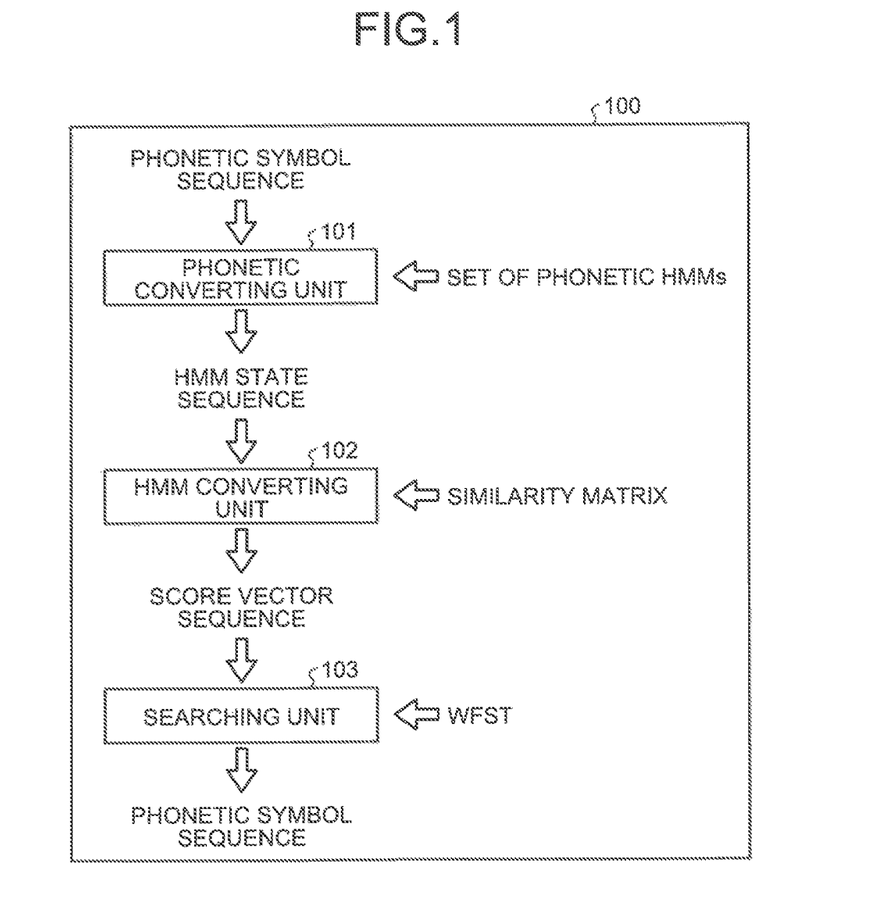
FIG. 1 is a block diagram illustrating an information processing device according to an embodiment.

FIG. 1 is a block diagram illustrating an exemplary configuration of an information processing device 100 according to the present embodiment. As illustrated, in FIG. 1, the information processing device 100 includes a phonetic converting unit 101, an HMM converting unit 102, and a searching unit 103.

The phonetic converting unit 101 converts a phonetic symbol sequence into an HMM state sequence in which states of the HMM are aligned. The phonetic converting unit 101, for example, converts a phonetic symbol sequence into HMM state sequences for respective phonetic symbols constituting the phonetic symbol sequence. The phonetic converting unit 101 combines the HMM state sequences resulting from conversion in the same order as that of the received phonetic symbol sequence, thereby deriving an HMM state sequence.

The HMM state sequences corresponding to the respective phonetic symbols may be information (e.g., phonetic HMMs) in which the states of the HMM learned by a publicly known method for speech recognition are aligned. In a case where the HMM is learned by monophone, the states of the HMM corresponding to the respective phonetic symbols simply need to be aligned. In a case where the HMM is associated with a pronunciation considering biphone, triphone, or four or more preceding and succeeding contexts, the phonetic converting unit 101 converts the phonetic symbols into the HMM state sequences while considering preceding and succeeding contexts of the same number.

In a case where the preceding and succeeding contexts are considered, phonetic symbols before a leading end of the phonetic symbol sequence and after a trailing end thereof are required for conversion into the HMM state sequence. The phonetic symbols before the leading end and after the trailing end are defined as silence. Silence is represented by "Sil". In the case of triphone, for example, if a phonetic symbol sequence "a, b, c" is received, the phonetic converting unit 101 considers the phonetic symbol sequence to be "sil, a, b, c, sil" and converts it into an HMM state sequence. In this example, the phonetic converting unit 101 extracts HMMs corresponding to three pieces of triphone of "sil–a+b", "a–b+c", and "b–c+sil" from a set of phonetic HMMs and combines them in order, thereby creating the HMM state sequence.

The HMM converting unit 102 converts an HMM state sequence into a score vector sequence. The HMM converting unit 102, for example, converts the HMM state sequence into the score vector sequence using a similarity matrix defining the similarity between the states of the HMM. It is assumed that the states of the HMM are numbered in sequence from 1. If the number of a state is x, a column vector of the x-th column in the similarity matrix is a score vector corresponding to the state x. The HMM converting unit 102 receives an HMM state sequence. The HMM converting unit 102 derives score vectors for respective states of the received HMM state sequence and outputs a score vector sequence in which the derived score vectors are aligned in the same order as that of the states corresponding thereto. The similarity matrix will be described later in detail.

The searching unit 103 searches for a path having a better score for the score vector sequence, that is, a better value obtained by adding a score on the path and a score obtained from the score vector sequence than that of the other paths out of paths included in a search network. The searching unit 103 outputs a phonetic symbol sequence corresponding to the retrieved path. The search network is a network in which the state of the HMM is associated with a node or an arc. In the WFST, for example, the state of the HMM corresponds to an input symbol of a transition (arc). In the WFST, the score on the path corresponds to the sum of weights of transitions constituting the path. In a case where the search network has no score on the path, that is, where all the weights of transitions in the WFST are 0, for example, the searching unit 103 search for a better path than the other paths while considering only the score obtained from the score vector sequence. The searching unit 103 may be a searching unit (hereinafter, referred to as a searching unit S) included in a decoder used in publicly known speech recognition methods.

The decoder used for speech recognition mainly includes an acoustic score calculating unit and the searching unit S. The acoustic score calculating unit converts a feature vector sequence obtained from speech into a score vector sequence. The score vector sequence is a sequence of vectors indicating a score (e.g., an acoustic score and an output probability) representing the degree of similarity of received speech to a specific pronunciation. The searching unit S uses the score vector sequence calculated by the acoustic score calculating unit to search for a path closer to the received speech in the search network. The searching unit S outputs a word sequence and a phonetic symbol sequence corresponding to the retrieved path.

The search network according to the present embodiment is represented by the WFST. In this case, the searching unit 103 (corresponding to the searching unit S) performs processing for finding a path having a better score out of paths included in the WFST obtained by composing the WFST obtained from the score vector sequence and the WFST supplied as the search network. To use the WFST as the search network and find only the best path, the publicly known Viterbi algorithm may be executed. The searching unit 103 that uses the WFST is described in Daniel Povey et al., "Generating Exact Lattices in the WFST Framework," in Proc. ICASSP, 2012, for example.

If output symbols of the WFST used as the search network are phonetic symbols, the searching unit 103 outputs a phonetic symbol sequence corresponding to the received score vector sequence. The searching unit 103 performs processing while considering that the value of the i-th dimension (i is an integer of 1 or larger) of the score vectors transmitted from the HMM converting unit 102 is an output probability (or a logarithmic output probability) of the state of the HMM of a state number i.

The value of the i-th dimension of the score vectors transmitted from the HMM converting unit 102 is not based on the probability because it indicates the similarity obtained from the similarity matrix. If the searching unit 103 considers the value to be the output probability (score), however, the searching unit 103 can search for a path having a better score than that of the other paths by performing the same processing as that of the publicly known searching unit S for speech recognition. Consequently, the searching unit 103 correctly operates.

The score vector sequence according no the present embodiment is converted not from speech but from the phonetic symbol sequence. For this reason, the information processing device 100 does not necessarily include the acoustic score calculating unit included in the decoder used in the publicly known speech recognition methods. The information processing device 100 simply needs to include the searching unit 103 having the same functions as those of the searching unit S. In a case where the information processing device 100 is applied to a speech recognition device, the searching unit S included in the speech recognition device and the searching unit 103 may have a configuration in common.

The phonetic converting unit 101, the HMM converting unit 102, and the searching unit 103 may be provided by a processor, such as a central processing unit (CPU), executing a computer program, that is, by software, for example. Alternatively, these units may be provided by hardware, such as an integrated circuit (IC). Still alternatively, these units may be provided by a combination of software and hardware.

Flow of Conversion

Figure 2:
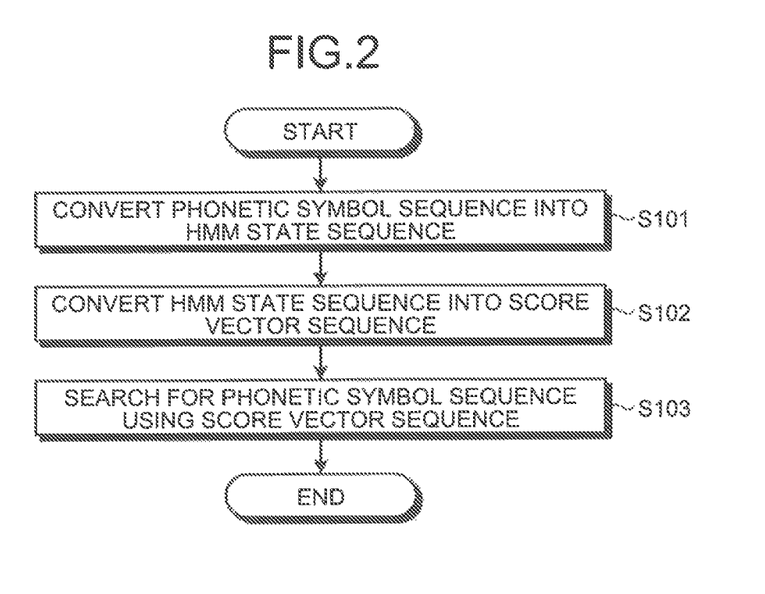
FIG. 2 is a flowchart illustrating conversion according to the embodiment.

The following describes conversion performed by the information processing device 100 according to the first embodiment having the configuration described above with reference to FIG. 2. FIG. 2 is a flowchart illustrating an example of conversion according to the first embodiment. The conversion is processing for converting a received phonetic symbol sequence into a similar phonetic symbol sequence.

If a phonetic symbol sequence is received, the phonetic converting unit 101 converts the received phonetic symbol sequence into an HMM state sequence (Step S101). As described above, the phonetic converting unit 101 refers to a set of phonetic HMMs learned in advance, for example, to derive HMM state sequences corresponding to the respective phonetic symbols. The phonetic converting unit 101 aligns the derived HMM state sequences in the same order as that of the corresponding phonetic symbols, thereby generating and outputting an aligned HMM state sequence.

The HMM converting unit 102 converts the HMM state sequence resulting from conversion performed by the phonetic converting unit 101 into a score vector sequence using the similarity matrix (Step S102). The searching unit 103 searches for a path having a better score for the score vector sequence than that of the other paths out of paths included in the search network and outputs a phonetic symbol sequence corresponding to the searched path (Step S103).

As described above, instead of the score vector sequence calculated by the acoustic score calculating unit used for speech recognition, the present embodiment derives the score vector sequence having similar values using the similarity matrix. The present embodiment uses the score vector sequence to search for the best phonetic symbol sequence by the same method as that of the searching unit for the conventional speech recognition. The present embodiment thus can convert the received phonetic symbol sequence into a similar phonetic symbol sequence.

Set of Phonetic HMMs

The following describes a set of phonetic HMMs in greater detail. The phonetic symbols according to the present embodiment have respective HMMs, and a set including the HMMs of the respective phonetic symbols is referred to as a set of phonetic HMMs. One phonetic symbol may possibly have a plurality of HMMs. This phenomenon occurs when preceding and succeeding contexts are considered, that is, when triphone is used, for example. In a case where triphone is used, a pronunciation is a phoneme, and one preceding and one succeeding phoneme contexts are considered. If the center phoneme is the same, but preceding and succeeding phonemes are different, one phonetic symbol may possibly have different HMMs.

The present embodiment may consider a phoneme context longer than or shorter than triphone. In a case where the HMM considering such context is used, the present embodiment creates the HMM state sequence while considering contexts preceding and succeeding the phonemes in the phonetic symbol sequence when converting the phonetic symbol sequence into the HMM state sequence, which has been described above. The set of phonetic HMMs can be created by generally known methods for creating a phonetic HMM in speech recognition.

Similarity Matrix

The following describes the similarity matrix in greater detail. The similarity matrix indicates the similarity between the states of the phonetic HMM. In the phonetic HMM used for speech recognition, a state may possibly be shared by HMMs associated with different phonetic symbols. The similarity matrix in this case indicates the similarity between the states resulting from sharing. When K (K is an integer of 2 or larger) is the number of states of the HMM (in a case where a state is shared, the number of states resulting from sharing), the similarity matrix is a K×K matrix.

If the state numbers are assigned to the respective states in sequence from 1, the component of the p-th row and the q-th column in the similarity matrix can be derived by calculating the similarity of a state p and a state q. While the size of the similarity matrix increases, the similarity matrix may be created between the states prior to sharing. In this case, the similarity between the states having the same state resulting from sharing is a value indicating complete agreement.

The similarity may be cosine similarity, for example. By assigning vectors to the respective states of the HMM, the similarity between the states can be calculated using the cosine similarity.

The vectors assigned to the respective states can be calculated as follows, for example. Speech data used to calculate the similarity is converted into a feature vector sequence first. The feature vector (feature value) may be any type of information. Examples of the feature value include, but are not limited to, the Mel frequency cepstral coefficient (MFCC), a filter bank features, the subband average time cepstrum (SATO), etc.

The speech data may be any data from which the similarity between the states of the HMM can be appropriately derived, such as speech data including all the phoneme HMMs. Let us assume a case where the speech data, is converted into a feature vector sequence having a length Ls. By supplying the feature vector sequence having the length Ls to the states of the HMMs included in the set of phonetic HMMs, Ls output probabilities (or logarithmic output probabilities) are derived for each state. The Ls-dimensional vector having the Ls output probabilities (or logarithmic output probabilities) as its components is a vector indicating the state of the EMM (vector assigned to the state).

Calculation of the vectors assigned to the respective states and calculation of the similarity between the states using the calculated vectors and other factors (calculation of the similarity matrix) are carried out in advance until the conversion is performed. The calculated similarity matrix may be stored in a storage medium or the like in the information processing device 100. The set of phonetic HMMs and the WFST may also be stored in the storage medium or the like in the information processing device 100.

WFST Used by the Searching Unit

In typical speech recognition using a WFST, a WFST obtained by composing and optimizing the following WPSTs is used: a WFST indicating an HMM (hereinafter, referred to as H), a WFST that converts a context-dependent pronunciation into a context-independent pronunciation (hereinafter referred to as C), a WFST indicating a pronunciation of a word (hereinafter, referred to as L), and a WFST indicating connection of a word (hereinafter, referred to as G). The present embodiment does not require L or G. Instead of L and G, the present embodiment introduces a WFST indicating a restriction on receivable phonemes (phonetic symbol sequence to be output) (hereinafter, referred to as R). The WFST used by the searching unit 103 is represented by H·C·R. The symbol "·" denotes a composing operation for the WFST. The composing operation may be performed by publicly known methods.

The searching unit 103 may use a WFST minimized by performing publicly known determination and minimization on H·C·R. In a case where HMMs are associated with context-independent phonetic symbols, C is not required. As described above, the searching unit 103 may be the searching unit S of the publicly known decoder used for speech recognition. Also known are methods for acquiring the N-th beat recognition result. Consequently, the present embodiment can derive a phonetic symbol sequence N-th most similar to the received phonetic symbol sequence by the similar methods. In this case, the present embodiment can derive the similar phonetic symbol sequence without introducing R. This is because the searching unit 103 simply needs to use a WFST of H·C and output a phonetic symbol sequence the second most or less similar to the received phonetic symbol sequence as the processing result.

By contrast, to place a restriction on the phonetic symbol sequence to be output, the present embodiment needs to use R. Let us assume a case where there is the restriction that a consonant is always followed by a vowel, for example. In this case, a phonetic symbol sequence similar to the received, phonetic symbol sequence out of phonetic symbol sequences satisfying the restriction is the phonetic symbol sequence to be output. If the received, phonetic symbol sequence has consecutive consonants, a phonetic symbol sequence in which part of the consonants are replaced by a vowel is output to satisfy the restriction.

Figure 3:
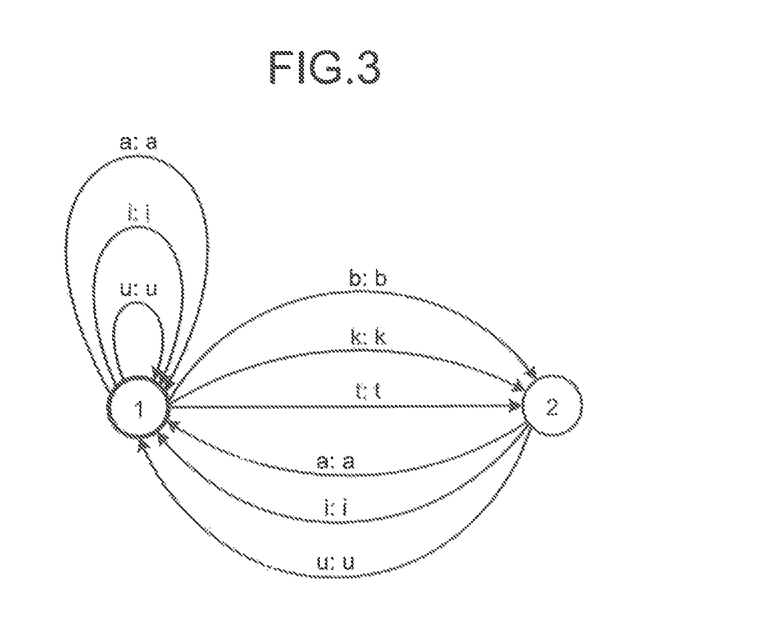
FIG. 3 is a diagram illustrating an example of a WFST indicating a restriction on receivable phonemes.

FIG. 3 is a diagram illustrating an example of such R (WFST indicating a restriction on receivable phonemes). FIG. 3 illustrates only three vowels "a", "i", and "u" and three consonants "b", "k", and "t" to simplify the illustration. Both of an initial state and a final state are a state 1. The vowels "a", "i", and "u" are assigned to an input symbol and an output symbol for each self-transition from the state 1 to the state 1. The consonants "b", "k", and "t" are assigned to an input symbol and an output symbol for each transition from the state 1 to a state 2. The vowels "a", "i", and "u" are assigned to an input symbol and an output symbol for each transition from the state 2 to the state 1.

Because there is no transition for getting out from the state 2 to which a consonant is assigned, the WFST satisfies the restriction that a consonant is followed only by a vowel. Illustration of weights is omitted. This is because no weight is required to place only a restriction.

The restriction is not limited to the example illustrated in FIG. 3 and may be any restriction. The present embodiment, for example, may use R indicating the restriction that it receives, out of phonetic symbol sequences having a length of M (M is an integer of 1 or larger) or longer, only a phonetic symbol sequence composed of phonetic symbol sequences having a length of M or longer appearing in a word sequence composed of words included in a vocabulary of a language to be processed. Alternatively, the present embodiment may use R indicating the restriction that it receives, out of phonetic symbol sequences having a length of M or longer, only a phonetic symbol sequence composed of phonetic symbol sequences having a length of M or longer appearing in a word sequence composed of words the use frequency of which is equal to or higher than a certain value out of words included in a vocabulary of a language to be processed. Still alternatively, the present embodiment may use R indicating the restriction that it receives, when N (N is an integer of 1 or larger) is the number of types of phonetic symbols, only a phonetic symbol sequence in which the number of types of phonetic symbol sequences having a length of M is smaller than $N^M$. By using R indicating the restrictions described above, the present embodiment can convert a phonetic symbol sequence incapable of being used in the target language into a phonetic symbol sequence similar thereto and capable of being used.

Figure 4:
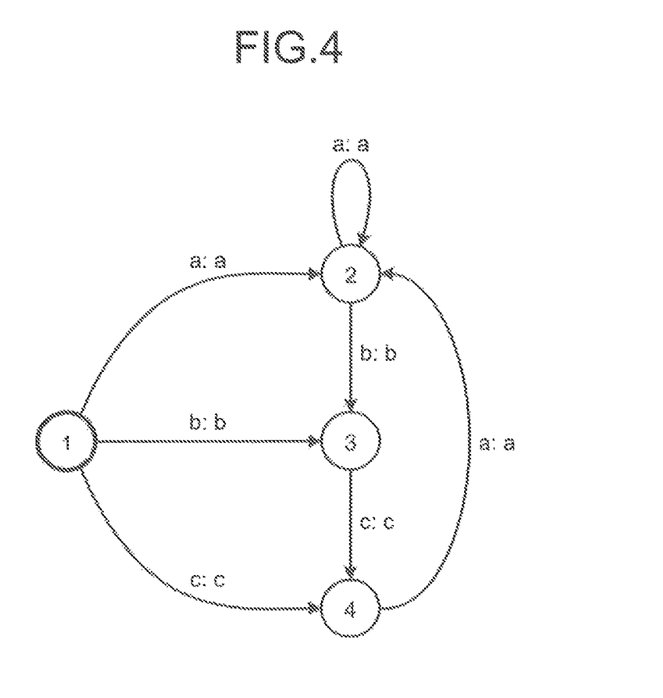
FIG. 4 is a diagram illustrating another example of the WFST indicating a restriction on receivable phonemes.

Let us assume a case where phonetic symbols used in the target language are only three symbols of "a", "b", and "c", for example. Let us also assume a case where, when M=2 is satisfied, combinations of the phonetic symbols appearing in the language are only "ab", "bc", "ca", and "aa". FIG. 4 is a diagram illustrating an example of R (WFST indicating a restriction on receivable phonemes) in this case. The state 1 is an initial state, and states 2 to 4 are final states. In this R, for example, a phonetic symbol sequence "aaabc" can be received; whereas a phonetic symbol sequence "cac" fails to be received. This is because there is a transition from the state 1 to the state 4 with the first "c" as an input symbol and a transition from the state 4 to the state 2 with the next "a" as an input symbol, but there is no transition having an input symbol of the last "c" in the state 2. All of "a", "b", and "c", which are shorter than M, are received.

A WFST obtained by composing C and R may be directly created depending on the restriction. In this case, the WFST used by the searching unit 103 is H·C. Let us assume a case where phonetic symbols are phonemes, and context-dependent phonemes are triphone, for example. In this case, C is a WFST that converts triphone into a context-independent phoneme, that is, monophone. The input symbol of the WFST is triphone, and the output symbol thereof is monophone. If the restriction can be represented by units of triphone, one or more transitions having an input symbol of triphone not satisfying the restriction is deleted from C. In other words, C is made from only one or more triphones satisfying the restriction. This configuration can place the restriction on the phonetic symbol sequence output from the information processing device 100 without introducing R.

Specific Example

Figure 5:
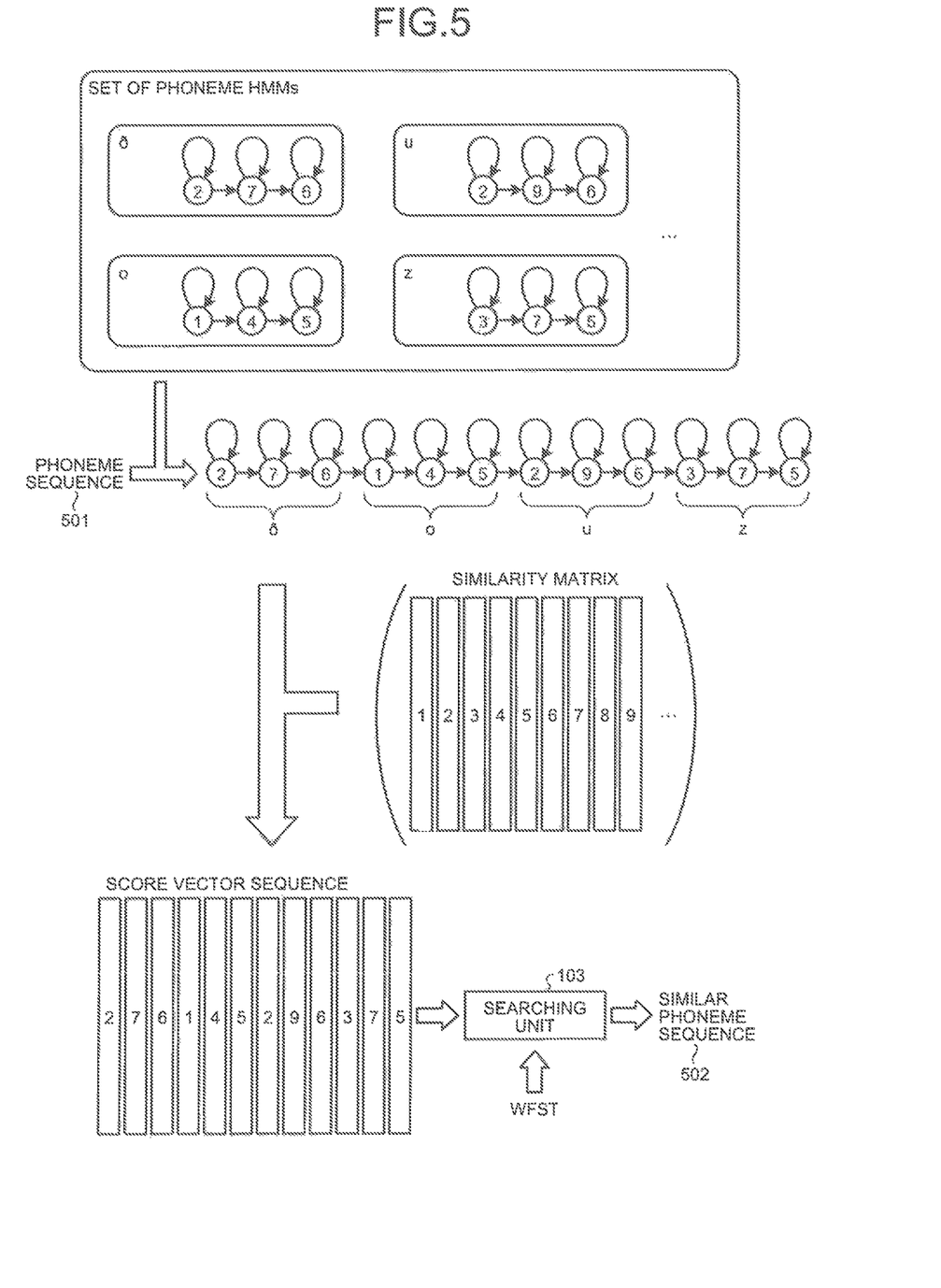
FIG. 5 is a diagram illustrating a specific example of processing for deriving a similar phonetic symbol sequence.

The following describes a specific example of processing for deriving a similar phonetic symbol sequence with reference to FIG. 5. In this example, the phonetic symbol sequence is a phoneme sequence, and a phoneme sequence 501 including four phonemes are received.

In speech recognition, HMMs having three states of "left-to-right," are typically associated with respective phonemes. In this example, the same HMMs are used. As a result, three states are associated with one phoneme, whereby an HMM state sequence composed of 12 states is obtained. In the phoneme HMMs used for speech recognition, a state may possibly be snared between HMMs associated with different phonemes. Numbers in the circles illustrated in FIG. 5 are numbers of the shared states. While FIG. 5 illustrates the arrows indicating transitions in the HMMs to facilitate understanding, the actual HMMs simply need to retain the shared state numbers assigned to the respective states. In this example, the phonetic converting unit 101 converts the phoneme sequence 501 into a numerical sequence "2, 7, 6, 1, 4, 5, 2, 0, 6, 3, 7, 5". The numerical sequence corresponds to the HMM state sequence.

The HMM converting unit 102 converts the HMM state sequence (numerical sequence) into a score vector sequence using the similarity matrix. The HMM converting unit 102 sequentially extracts and aligns column vectors corresponding to the respective numbers included in the numerical sequence from the column vectors of the similarity matrix, thereby deriving the score vector sequence. In the example illustrated in FIG. 5, the HMM converting unit 102 aligns the column vectors corresponding to the state numbers of the respective states in the same order as that of the states included in the HMM state sequence, like the second column vector, the seventh column vector, the sixth column vector. The HMM converting unit 102 thus derives the score vector sequence. A numerical value i in a score vector indicates that the score vector is an i-th column vector in the similarity matrix.

If the score vector sequence created in this manner is received by the searching unit 103, a similar phoneme sequence satisfying the restriction provided by the WFST can be derived by the same processing as speech recognition. A phoneme sequence 502 is an example of a phoneme sequence similar to the phoneme sequence 501 derived in this manner. This example uses a WFST(R) having the restriction that first two phoneme sequences included in the phoneme sequence 501 fail to be recognized. In this case, a phoneme sequence "do" assumed to be the closest to the two phoneme sequences, for example, is output instead of the two phoneme sequences.

As described above, when receiving a phonetic symbol sequence, the information processing device according to the first embodiment can derive a similar phonetic symbol sequence.

Second Embodiment

A second embodiment describes an example of a recognition device that uses the processing for deriving a similar phonetic symbol sequence. Speech can be converted into a word sequence by publicly known speech recognition techniques. It is more difficult to convert two speeches having similar pronunciations into different word sequences than to convert two speeches having completely dissimilar pronunciations into different word sequences. By contrast, even if a phonetic symbol sequence of a word registered in a speech recognition device is slightly different from a correct phonetic symbol sequence, the word can be recognized.

Widely known are speech recognition devices that can add a new word to a recognizable vocabulary. The pronunciation of the word to be added is specified by a phonetic symbol sequence. Various types of such speech recognition devices are known, including a device that uses a WFST (e.g., Paul R. Dixon et al., "A Specialized WFST Approach for Class Models and Dynamic Vocabulary," in Proc. INTERSPEECH, 2012).

There have also been developed methods for adding one or more paths that enable recognition of one or more sub-words in a WFST to recognize a newly added word in such speech recognition devices. Each of the sub-words is an element constituting a word. Examples of a sub-word include, but are not limited to, a phoneme, a syllable, an element connecting them, etc. In a case where the sub-word is a phonetic symbol, a phonetic symbol sequence corresponding to the received speech is derived. If the derived phonetic symbol sequence is identical to the phonetic symbol sequence of the newly added word, the newly added word is output as a recognition result.

If a path for recognizing the sub-word is created to output a desired phonetic symbol sequence, the size of the WFST increases. To address this, some kind of restrictions may possibly be placed on the phonetic symbol sequence that can be recognized by the path for recognizing the sub-word. With such restrictions, the size of the WFST can be reduced, but a word having a phonetic symbol sequence not satisfying the restrictions fails to be recognized.

Let us assume a case where a WFST is composed of one or more paths for recognizing one or more sub-words that place a restriction to recognize only one or more phonetic symbol sequences having high use frequency in a target language of speech recognition, for example. The size of the WFST can be made smaller than that of a WFST that is composed of one or more paths for recognizing one or more sub-words that place no restriction. If a word having a phonetic symbol sequence not satisfying the restriction is added, the word is not recognized. To address this, the information processing device 100 according to the first embodiment is used to convert the phonetic symbol sequence not satisfying the restriction into a phonetic symbol sequence satisfying the restriction. The phonetic symbol sequence resulting from conversion is received as a phonetic symbol sequence of a word to be added. As described above, a word represented by a certain phonetic symbol sequence may possibly be recognized with another phonetic symbol sequence similar thereto. When speech according to the phonetic symbol sequence prior to conversion is received, the speech recognition device can recognize the word added as the phonetic symbol sequence resulting from conversion.

Device Configuration

Figure 6:
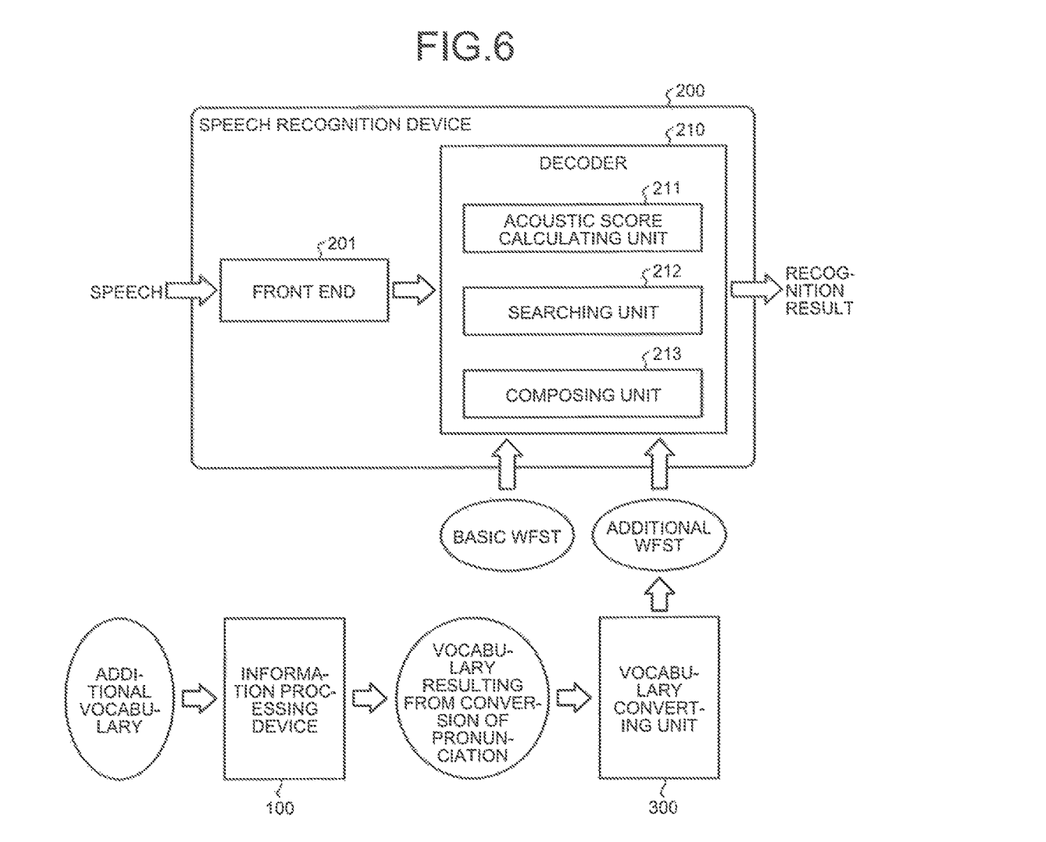
FIG. 6 is a block diagram illustrating a recognition system according to the embodiment.

FIG. 6 is a block diagram illustrating an exemplary configuration of a recognition system according to the present embodiment. As illustrated in FIG. 6, the recognition system includes the information processing device 100, a speech recognition device 200, and a vocabulary converting unit 300.

Because the information processing device 100 has the same functions as those of the first embodiment, same elements are denoted by same referential numerals, and overlapping explanation thereof will be omitted. The information processing device 100 according to the present embodiment is used to perform processing for converting a phonetic symbol sequence of a word included in an additional vocabulary, to which a phonetic symbol sequence not satisfying a restriction may possibly be assigned, into a similar phonetic symbol sequence satisfying the restriction.

The speech recognition device 200 includes a front end 201 and a decoder 210. The front end 201 performs processing for detecting a speech section from received speech, processing for extracting a feature value (feature vector) on the detected section, and other processing. The decoder 210 uses a basic WFST, an additional WFST, and a feature vector transmitted from the front end 201 to output a word sequence assumed to be closest to the received speech as a recognition result.

The basic WFST is a WFST obtained by adding the path for recognizing the sub-word to a publicly known WFST used for speech recognition. The additional WFST is used to recognize an additional vocabulary incapable of being recognized by the basic WFST. The additional WFST is created by the vocabulary converting unit 300 based on the additional vocabulary.

The vocabulary converting unit 300 creates the additional WFST based on the additional vocabulary resulting from conversion of a pronunciation. The vocabulary converting unit 300, for example, converts the additional vocabulary, determines the sub-word and a class to be an input symbol, and creates the additional WFST including a path having a word as an output symbol.

The decoder 210 includes an acoustic score calculating unit 211, a searching unit 212, and a composing unit 213. The acoustic score calculating unit 211 converts a feature vector sequence obtained from speech into a score vector sequence. The composing unit 213 uses the basic WFST and the additional WFST to compose a WFST including at least a part required by the searching unit 212 and allows the searching unit 212 to refer to the WFST. Similarly to the searching unit S and the searching unit 103, the searching unit 212 uses the score vector sequence calculated by the acoustic score calculating unit 211 to search for a path closer to the received speech in the search network (WFST composed by the composing unit 213). The searching unit 212 outputs a word sequence and a phonetic symbol sequence corresponding to the retrieved path.

The method for making a newly added word recognizable is not limited to the method illustrated in FIG. 6 and may be any conventional method. Besides the method described in Paul R. Dixon et al., "A Specialized WFST Approach for Class Models and Dynamic Vocabulary," in Proc. INTERSPEECH, 2012, examples of the method include, but are not limited to, a method of adding an additional word to L, a method of embedding a path relating to an additional word in G without adding the additional word to L, etc.

If there is a restriction on a phonetic symbol sequence capable of being recognized by the path for recognizing the sub-word included in the basic WFST, the information processing device 100 converts the phonetic symbol sequence using H·C·R restricted by R indicating the restriction. Alternatively, the information processing device 100 directly creates restricted C and converts the phonetic symbol sequence using H·C. In a case where HMMs are associated with context-independent phonetic symbols, C is not required.

The set of phonetic HMMs serving as a source of H used to create the WFST used by the information processing device 100 is a set of phonetic HMMs serving as a source of H used to create the basic WFST. Consequently, the information processing device 100 can derive a similar phonetic symbol sequence hard to be distinguished by the speech recognition device.

As described above, the restriction placed by the path for recognizing the sub-word is made identical with the restriction placed on output from the information processing device 100. Consequently, the speech recognition device 200 can recognize a word of a desired phonetic symbol sequence.

The system configuration illustrated in FIG. 6 is given by way of example only, and the present embodiment is not limited thereto. The speech recognition device 200, for example, may have functions of at least one of the information processing device 100 and the vocabulary converting unit 300. The searching unit 212 of the speech recognition device 200 and the searching unit 103 of the information processing device 100 may be combined into one unit because they have similar functions.

As described above, the recognition system according to the second embodiment can make a word recognizable by converting a phonetic symbol sequence incapable of being recognized by the speech recognition device into a similar phonetic symbol sequence capable of being recognized by it.

As described above, the first and the second embodiments can derive a phonetic symbol sequence similar to another phonetic symbol sequence.

Figure 7:
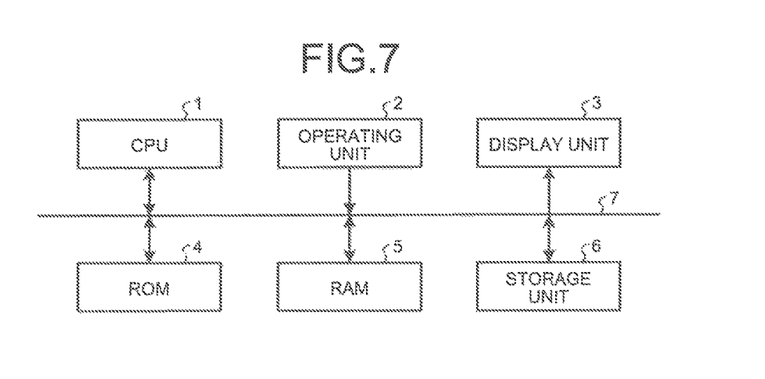
FIG. 7 is a diagram illustrating a hardware configuration of the information processing device according to the embodiment.

The following describes a hardware configuration of the information processing device 100 according to the first and the second embodiments with reference to FIG. 7. FIG. 7 is a diagram for explaining an exemplary hardware configuration of the information processing device 100 according to the first and the second embodiments.

As illustrated in FIG. 7, the information processing device 100 includes a CPU 1, an operating unit 2, a display unit 3, a read only memory (ROM) 4, a random access memory (RAM) 5, a storage unit 6, a bus 7, and other components. The units and the memories are connected to one another via the bus 7.

The CPU 1 executes various types of processing in cooperation with various types of control programs stored in advance in the ROM 4 or the storage unit 6 using a predetermined area in the RAM 5 as a work area. The CPU 1 collectively controls operations of the units constituting the information processing device 100. The CPU 1 also performs functions of functional units, which will be described later, in cooperation with a predetermined computer program stored in advance in the ROM 4 or the storage unit 6.

The operating unit 2 is an input device, such as a mouse and a keyboard. The operating unit receives information input by a user as instruction signals and outputs the instruction signals to the CPU 1.

The display unit 3 is a display device, such as a liquid-crystal display, and displays various types of information based on display signals from the CPU 1.

The ROM 4 stores therein computer programs, various types of setting information, and other data relating to control of the information processing device 100 in a non-rewritable manner.

The RAM 5 is a volatile storage medium, such as a synchronous dynamic RAM (SDRAM), and functions as the work area for the CPU 1. Specifically, for example, the RAM 5 serves as a buffer that temporarily stores therein various types of variables and values of parameters used in pronunciation conversion, HMM conversion and search.

The storage unit 6 includes a semiconductor storage medium, such as a flash memory, and a magnetically or optically recordable storage medium. The storage unit 6 stores therein computer programs, various types of setting information, and other data relating to control of a phonetic symbol sequence conversion device in a rewritable manner. The storage unit 6 also stores therein various types of information on the set of phonetic HMMs, the similarity matrix, and the WFST in advance and registers therein results of arithmetic operations performed on the received phonetic symbol sequence.

Part or ail of the devices according to the embodiments above may operate on different pieces of hardware or a single piece of hardware.

The speech recognition device 200 and the vocabulary converting unit 300 according to the second embodiment may have the same hardware configuration as that of the information processing device 100. The speech recognition device 200 may further include a recording unit that acquires speech data. Examples of the recording unit include, but are not limited to, a microphone, a communication device, etc.

A computer program executed by the devices (e.g., the information processing device and the speech recognition device) according to the first embodiment or the second embodiment is embedded and provided in the ROM 4, for example.

The computer program executed by the devices according to the first embodiment or the second embodiment may be recorded in a computer-readable recording medium, such as a compact, disc read only memory (CD-ROM), a flexible disk (FD), a compact disc recordable (CD-R), and a digital versatile disc (DVD), as an installable or executable file and provided as a computer program product.

The computer program executed by the devices according to the first embodiment or the second embodiment may be stored in a computer connected to a network, such as the Internet, and provided by being downloaded via the network. Furthermore, the computer program executed by the devices according to the first embodiment or the second embodiment may be provided or distributed via a network, such as the Internet.

The computer program executed by the devices according to the first embodiment or the second embodiment can cause a computer to function as the units of the devices. In the computer, a CPU reads the computer program from a computer readable storage medium and executes it on the main memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
one or more processors electrically coupled to a memory and configured to:
  convert a phonetic symbol sequence into a hidden Markov model (HMM) state sequence in which states of the HMM are aligned;
  convert the HMM state sequence into a score vector sequence indicating a degree of similarity to a specific pronunciation using a similarity matrix defining similarity between the states of the HMM; and
  search for a path having a better score for the score vector sequence than a score of other paths out of paths included in a search network and output a phonetic symbol sequence corresponding to the path that is searched for, wherein:
    the search network is a weighted finite state transducer generated using a first weighted finite state transducer having a restriction on the phonetic symbol sequence to be output, and
    the first weighted finite state transducer receives, when N (N is an integer of 1 or larger) is the number of types of phonetic symbol, the phonetic symbol sequence alone in which the number of types of the phonetic symbol sequence having a length of M (M is an integer of 1 or larger) is smaller than $N^M$.

2. The information processing device according to claim 1, wherein the search network is a weighted finite state transducer obtained by composing the first weighted finite state transducer, a second weighted finite state transducer indicating the HMM, and a third weighted finite state transducer that converts a context-dependent phonetic symbol into a context-independent phonetic symbol.

3. The information processing device according to claim 1, wherein the one or more processors are further configured to search for the path while considering that a value of an i-th dimension (i is an integer of 1 or larger) of a score vector included in the score vector sequence is an output probability of a state i in the HMM.

4. A recognition system comprising an information processing device and a recognition device, wherein:
the information processing device comprising:
  one or more first processors electrically coupled to a first memory and configured to:
    convert a phonetic symbol sequence of an added word into an HMM state sequence in which states of the HMM are aligned;
    convert the HMM state sequence into a score vector sequence indicating a degree of similarity to a specific pronunciation using a similarity matrix defining similarity between the states of the HMM; and
    search for a path having a better score for the score vector sequence than a score of other paths out of paths included in a search network and output a phonetic symbol sequence corresponding to the path that is searched for, wherein:
      the search network is a weighted finite state transducer generated using a first weighted finite state transducer having a restriction on the phonetic symbol sequence to be output, and
      the first weighted finite state transducer receives, when N (N is an integer of 1 or larger) is the number of types of phonetic symbol, the phonetic symbol sequence alone in which the number of types of the phonetic symbol sequence having a length of M (M is an integer of 1 or larger) is smaller than $N^M$, and
the recognition device comprising:
  one or more second processors electrically coupled to a second memory and configured to:
    set the phonetic symbol sequence output by the one or more first processors as a phonetic symbol sequence of the added word; and
    register the added word as a word to be recognized.

5. An information processing method comprising:
converting a phonetic symbol sequence into an HMM state sequence in which states of the HMM are aligned;
converting the HMM state sequence into a score vector sequence indicating a degree of similarity to a specific pronunciation using a similarity matrix defining similarity between the states of the HMM; and
searching for a path having a better score for the score vector sequence than a score of other paths out of paths included in a search network and outputting a phonetic symbol sequence corresponding to the path that is searched for, wherein:
  the search network is a weighted finite state transducer generated using a first weighted finite state transducer having a restriction on the phonetic symbol sequence to be output, and
  the first weighted finite state transducer receives, when N (N is an integer of 1 or larger) is the number of types of phonetic symbol, the phonetic symbol sequence alone in which the number of types of the phonetic symbol sequence having a length of M (M is an integer of 1 or larger) is smaller than $N^M$.

* * * * *